US010922662B2

(12) United States Patent
Brennan et al.

(10) Patent No.: US 10,922,662 B2
(45) Date of Patent: Feb. 16, 2021

(54) AUTOMATED MEETING SCHEDULER

(71) Applicant: Microsoft Technology Licensing, LLC, Redmond, WA (US)

(72) Inventors: David J. Brennan, Redmond, WA (US); Stéphane Morichére-Matte, Vancouver (CA); John R. Sanders, Seattle, WA (US); David M. Gray, Bellevue, WA (US); Aaron Lo, Port Coquitlam (CA); Isaac Supeene, San Bruno, CA (US); Aryamman Jain, San Francisco, CA (US); Anson Ho, Redmond, WA (US); Priya Murali, Mississauga (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 876 days.

(21) Appl. No.: 15/640,149

(22) Filed: Jun. 30, 2017

(65) Prior Publication Data
US 2019/0005462 A1    Jan. 3, 2019

(51) Int. Cl.
*G06Q 10/10* (2012.01)
(52) U.S. Cl.
CPC .............................. *G06Q 10/1095* (2013.01)
(58) Field of Classification Search
CPC ....... G06Q 10/1095; G06Q 10/063116; G06Q 10/06311; G06Q 10/109; G06Q 10/1093; G06Q 10/06314
See application file for complete search history.

(56) References Cited

U.S. PATENT DOCUMENTS

| 5,050,077 A | * | 9/1991 | Vincent | G06Q 10/109 |
| | | | | 705/7.19 |
| 5,197,000 A | * | 3/1993 | Vincent | G06Q 10/109 |
| | | | | 705/7.19 |
| 5,323,314 A | * | 6/1994 | Baber | G06Q 10/1095 |
| | | | | 345/163 |

(Continued)

OTHER PUBLICATIONS

Shakshuki, et al., "A distributed multi-agent meeting scheduler", In Journal of Computer and System Sciences, vol. 74, Issue 2, Mar. 2008, pp. 279-296.

*Primary Examiner* — Scott L Jarrett
(74) *Attorney, Agent, or Firm* — Mannava & Kang, P.C.

(57) ABSTRACT

A receiver receives a request to schedule a meeting from a user and in response, prompts the user to provide meeting information including time information and attendee information for scheduling the meeting. A meeting scheduler identifies potential dates and potential times based on the meeting information. The meeting scheduler further detects locations of the attendees based on the potential dates and identifies potential meeting locations based on attendees' location. The meeting scheduler also computes date scores for the potential dates, time scores for the potential times, and location scores for the meeting locations to select a date, a time, and a meeting location based on scores to determine a meeting schedule. The meeting scheduler further selects a conferencing mechanism for the meeting and provides the meeting schedule comprising the selected date, time, and meeting location, and the selected conferencing mechanism as a meeting invite option to the user.

20 Claims, 6 Drawing Sheets

(56) References Cited

U.S. PATENT DOCUMENTS

| | | | | |
|---|---|---|---|---|
| 6,101,480 | A * | 8/2000 | Conmy | G06Q 10/109 705/7.18 |
| 7,693,734 | B2 * | 4/2010 | Christenson | G06Q 10/1095 370/261 |
| 7,693,736 | B1 * | 4/2010 | Chu | G06Q 10/1095 705/7.19 |
| 7,703,048 | B2 * | 4/2010 | Alford, Jr. | G06Q 10/109 715/747 |
| 7,818,198 | B2 * | 10/2010 | Masselle | G06Q 10/1093 705/7.18 |
| 7,876,714 | B2 * | 1/2011 | Ethier | H04L 12/1818 370/260 |
| 7,929,678 | B2 * | 4/2011 | Shaffer | H04M 3/42348 379/202.01 |
| 8,005,703 | B2 * | 8/2011 | Chakra | G06Q 10/06311 705/7.19 |
| 8,065,175 | B1 * | 11/2011 | Lewis | G06Q 10/063116 705/7.19 |
| 8,346,589 | B1 * | 1/2013 | Norton | G06Q 10/1093 705/7.18 |
| 8,346,590 | B2 | 1/2013 | Norton et al. | |
| 8,494,891 | B2 * | 7/2013 | Bhogal | G06Q 10/1095 705/7.19 |
| 8,965,972 | B2 * | 2/2015 | Faulbacher | G06Q 10/10 709/204 |
| 9,578,461 | B2 | 2/2017 | Benzatti et al. | |
| 9,978,043 | B2 * | 5/2018 | Jon | G06F 3/0482 |
| 10,510,026 | B1 * | 12/2019 | Adamson | G06F 9/543 |
| 2002/0184063 | A1 | 12/2002 | Kaufman et al. | |
| 2003/0204474 | A1 * | 10/2003 | Capek | G06Q 20/382 705/64 |
| 2004/0078436 | A1 * | 4/2004 | Demsky | G06Q 10/109 709/206 |
| 2005/0018826 | A1 * | 1/2005 | Benco | H04M 3/56 379/202.01 |
| 2006/0293943 | A1 * | 12/2006 | Tischhauser | G06Q 10/06314 705/7.24 |
| 2007/0021997 | A1 * | 1/2007 | Hayes, Jr. | G06Q 10/109 705/7.19 |
| 2007/0036317 | A1 * | 2/2007 | Shaffer | H04M 3/56 379/202.01 |
| 2007/0106725 | A1 * | 5/2007 | Starr | G06Q 10/109 709/204 |
| 2007/0118415 | A1 * | 5/2007 | Chen | G06Q 10/02 705/5 |
| 2008/0114840 | A1 * | 5/2008 | Rollin | G06Q 10/06311 709/206 |
| 2009/0055234 | A1 * | 2/2009 | Li | G06Q 10/109 705/7.24 |
| 2009/0100037 | A1 * | 4/2009 | Scheibe | G06F 16/9537 |
| 2009/0132329 | A1 * | 5/2009 | Lam | G06Q 10/06311 705/7.13 |
| 2009/0276277 | A1 * | 11/2009 | Vansteenkiste | G06Q 10/109 705/7.19 |
| 2009/0327227 | A1 | 12/2009 | Chakra et al. | |
| 2010/0015995 | A1 * | 1/2010 | Caspi | H04L 67/18 455/456.1 |
| 2010/0293029 | A1 * | 11/2010 | Olliphant | G06Q 10/109 705/7.19 |
| 2011/0103568 | A1 * | 5/2011 | Gartner | H04M 3/565 379/202.01 |
| 2011/0106573 | A1 * | 5/2011 | McNamara | G06Q 10/1095 705/5 |
| 2011/0184768 | A1 * | 7/2011 | Norton | G06Q 10/109 705/5 |
| 2012/0278381 | A1 * | 11/2012 | Ferlitsch | G06Q 10/109 709/203 |
| 2013/0080204 | A1 * | 3/2013 | Khorashadi | H04W 4/021 705/7.19 |
| 2013/0132145 | A1 * | 5/2013 | Hurewitz | G06Q 10/1095 705/7.19 |
| 2013/0246526 | A1 * | 9/2013 | Wu | G06Q 10/109 709/204 |
| 2014/0229099 | A1 * | 8/2014 | Garrett | H04W 4/029 701/465 |
| 2014/0372162 | A1 * | 12/2014 | Dhara | G06Q 10/1095 705/7.19 |
| 2015/0006217 | A1 * | 1/2015 | Buehl | G06Q 10/1095 705/7.19 |
| 2015/0058057 | A1 * | 2/2015 | Egan | G06Q 10/1095 705/7.19 |
| 2015/0193739 | A1 * | 7/2015 | Min | G06Q 10/1095 705/7.19 |
| 2015/0324755 | A1 | 11/2015 | Bathiya | |
| 2015/0356516 | A1 * | 12/2015 | Kagan | G06Q 10/1095 705/7.19 |
| 2016/0342950 | A1 | 11/2016 | Pignataro et al. | |
| 2016/0350720 | A1 * | 12/2016 | Moorjani | G06Q 10/1095 |
| 2017/0061389 | A1 * | 3/2017 | Naughton | G06Q 10/1095 |
| 2017/0178080 | A1 * | 6/2017 | Abebe | G06F 16/383 |
| 2017/0357917 | A1 * | 12/2017 | Holmes | G06Q 10/06314 |
| 2018/0341925 | A1 * | 11/2018 | Leske | G06Q 10/1095 |

\* cited by examiner

500

Receiving an input from a user, where the input is indicative of a request to schedule a meeting
502

↓

Prompting the user to provide meeting information including time information and attendee information for scheduling the meeting
504

↓

Identifying potential date(s) to schedule the meeting, based on the meeting information, where a potential date has one or more potential times
506

↓

Determining availability of the attendees based on the potential dates for scheduling the meeting
508

↓

Detecting locations of the attendees, based on the availability of the attendees, the potential dates, and a location group tree
510

↓

Identifying one or more potential meeting locations based on the locations of the attendees
512

↓

Determining availability of the meeting locations based on the potential Dates for scheduling the meeting
514

↓

Computing date scores for the potential dates based on the meeting information
516

AUTOMATED MEETING SCHEDULER

BACKGROUND

Scheduling meetings is one of the most common tasks in enterprises. A person who is tasked with scheduling a meeting often struggles to determine a suitable time and meeting location for the meeting to take place as the time and the meeting location for scheduling the meeting are determined based on various factors, such as availability of attendees, duration of the meeting, availability of the meeting locations, and the like. As a result, scheduling of meetings can be time-consuming and tedious, and sometimes may result into poorly scheduled and unproductive meetings.

In recent years, the importance of meeting scheduling systems facilitating automatic scheduling of meetings has increased. However, such meeting scheduling systems lack intelligence for determining a suitable time and meeting location for a meeting, and manual intervention is still required. For example, a meeting scheduling system may determine one or more potential times and meeting locations and provide these to an organizer who desires to schedule a meeting. The organizer may then manually analyze the potential times and meeting locations to select a suitable time, and meeting location from amongst the potential times and meeting locations for scheduling the meeting. Because the potential times and meeting locations are manually analyzed by the organizer, the whole process may be time-consuming and error prone.

Furthermore, in today's digital age, it is more common for employees to work across multiple enterprise locations in different states or even different countries rather than at a same enterprise location. However, such significant factors are not taken into consideration by the meeting scheduling systems while determining meeting schedules. Therefore, currently available meeting scheduling systems may be time-intensive, inefficient, and unreliable.

BRIEF DESCRIPTION OF DRAWINGS

Features of the present disclosure are illustrated by way of examples shown in the following figures. In the following figures, like numerals indicate like elements, in which:

FIGS. 5*a* and 5*b* illustrate a computer-implemented method depicting functionality of the system, according to an example embodiment of the present disclosure.

DETAILED DESCRIPTION

Figure 1:
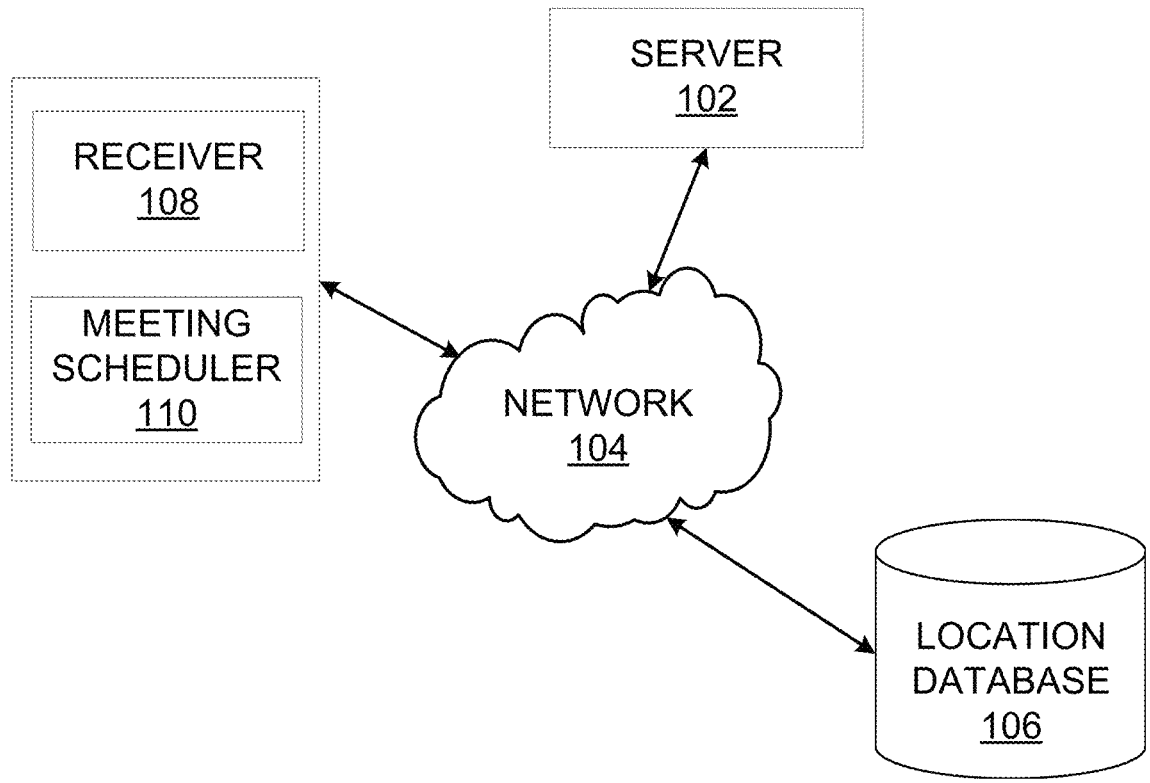
FIG. 1 illustrates a network environment implementing a system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for determination of meeting schedules. In an example, a meeting schedule includes, but is not limited to, a conferencing mechanism, a date, a time, and, a meeting location for the meeting to take place. The conferencing mechanism may be one of an audio conferencing mechanism, a video conferencing mechanism, an in-person conference mechanism, or any combination thereof.

In an example embodiment of the present disclosure, the system may include a receiver and a meeting scheduler. The receiver and the meeting scheduler may be in communication with each other to perform the functionalities of the system. Further, in an example embodiment, the system may be communicatively coupled to a location database and a server through one or more communication links.

For the purpose of determination of a meeting schedule, the receiver of the system of the present subject matter may receive an input from a user. The input may be indicative of a request to schedule a meeting. In an example, the user may be an employee of an enterprise who needs to schedule a meeting between two or more employees of the enterprise. Upon receiving the input, the receiver may prompt the user to provide meeting information for scheduling the meeting. In an example, the meeting information may include time information and attendee information. The time information may be indicative of one of a preferred date range for the meeting, an approximate time period from a current period, and a specific date and time for the meeting. For example, if the user needs to schedule a meeting between 1 Jun. 2017 and 3 Jun. 2017, then the date range i.e., 1 Jun. 2017 to 3 Jun. 2017 may be understood as a preferred date range for scheduling the meeting. Further, the attendee information may be indicative of names of attendees that are required to attend the meeting. In an example, the user may or may not be an attendee of the meeting.

In an example embodiment, once the meeting information is received, the meeting scheduler of the system may identify one or more potential dates for scheduling the meeting based on the meeting information. A potential date has one or more potential times for scheduling the meeting. In an example, if the preferred date range provided by the user is 1 Jun. 2017 to 3 Jun. 2017, then the potential dates may be 1 Jun. 2017, 2 Jun. 2017, and 3 Jun. 2017.

Thereafter, the meeting scheduler may determine availability of the attendees based on the potential dates for scheduling the meeting. In an example, the meeting scheduler may also access the location database and the server to determine whether the attendees are available or not on the identified potential dates. Subsequent to determination of the availability of the attendees, the meeting scheduler may detect locations of the attendees. The locations of the attendees may be determined based on the availability of the attendees and the potential dates.

Furthermore, in an example embodiment, the meeting scheduler may identify one or more meeting locations based on the locations of the attendees. In an example, a meeting location may be a place in the enterprise where the meeting may be held. The meeting scheduler may further determine availability of the meeting locations based on the potential dates for scheduling the meeting. For example, if the potential dates are 1 Jun. 2017, 2 Jun. 2017, and 3 Jun. 2017, then the meeting scheduler may determine whether the identified meeting locations are available for the meeting on these dates. In an example embodiment, the meeting scheduler may determine the meeting locations and the availability of the meeting locations based on information stored in the location database.

Subsequently, the meeting scheduler may compute date scores for the potential dates based on the meeting information. The meeting scheduler may further compute time scores for the potential times based on the meeting information and the availability of the attendees, and location scores for the available meeting locations based on proximity to the locations of the attendees.

In an example embodiment, the meeting scheduler may select a date, a time, and a meeting location from amongst the potential dates, times, and meeting locations to determine a meeting schedule. The meeting scheduler may make a selection based on the date scores, the time scores, and the location scores. In an example, the selected date may be a date with a highest date score and the selected time may be a time with a highest time score. Further, the selected meeting location may be a meeting location with a highest location score.

Additionally, the meeting scheduler may select a conferencing mechanism from at least one of an audio conferencing mechanism, a video conferencing mechanism, an in-person conference mechanism, or any combination thereof, based on the selected meeting location for the meeting schedule. The meeting scheduler may then provide the meeting schedule comprising the selected date, time, and meeting location, and the selected conferencing mechanism as a meeting invite option to the user.

The system of the present disclosure may offer time-effective and accurate determination of a time and a meeting location for scheduling a meeting. Further, the time and the meeting location for the meeting are automatically determined from amongst the potential dates, times, and meeting locations based on date scores, time scores, and meeting scores, thereby alleviating the need for manual intervention by a user. The system also determines a conferencing mechanism for the meeting based on the determined meeting location for the meeting schedule. Therefore, the present subject matter may provide economic, accurate, reliable, and time-effective determination of meeting schedules.

FIG. 1 illustrates a network environment implementing a system 100, according to an example embodiment of the present disclosure. The system 100 may also be referred to as an automated meeting scheduler. In an example embodiment, the system 100 is for automatically determining a meeting schedule for a user, also referred to as an organizer, in response to a request from the user for scheduling the meeting between two or more attendees of an enterprise. The user may or may not be an attendee of the meeting. In an example, the user may be an employee of an enterprise who needs to schedule a meeting with other employees of the enterprise. Further, in an example, the meeting schedule may include, but is not limited to, a conferencing mechanism, a date, a time, and, a meeting location for the meeting to take place. The conferencing mechanism may include one of an audio conferencing mechanism, a video conferencing mechanism, an in-person conference mechanism, or any combination thereof.

The description hereinafter is explained with reference to scheduling of a meeting between employees of an enterprise only for the purpose of explanation and should not be construed as a limitation. One of ordinary skill in the art will appreciate that a meeting may also be scheduled between non-employees and employees of the enterprise.

In an example embodiment, the network environment may be a public network environment, including thousands of individual computers, laptops, various servers, such as blade servers, and other computing devices. In another example embodiment, the network environment may be a private network environment with a limited number of computing devices, such as individual computers, servers, and laptops. Furthermore, the system 100 may be implemented in a variety of computing systems, such as a smartphone, a tablet, and the like. In an example, the system 100 may be implemented as a mobile application in a mobile device.

According to an example embodiment, the system 100 is 1.0 communicatively coupled with a server 102 through a network 104. In an example embodiment, the server 102 may be a collaborative enterprise server that supports Email information, contacts and tasks information, calendar information, and web-based and mobile information access, and data storage. For example, the server 102 may be a mail server and calendaring server. In an example embodiment, the network 104 may be a wireless network, a wired network, or a combination thereof. The network 104 may also be an individual network or a collection of many such individual networks, interconnected with each other and functioning as a single large network, e.g., the Internet or an intranet. The network 104 may be implemented as one of the different types of networks, such as intranet, local area network (LAN), wide area network (WAN), the internet, and the like. Further, the network 104 may include a variety of network devices, including routers, bridges, servers, computing devices, storage devices, and the like.

In an example embodiment, the system 100 is further communicatively coupled with a location database 106 through the network 104. The location database 106 may be a spatially indexed database that includes information of various meeting locations within the enterprise. In an example, information of a meeting location may include, but is not limited to, a seating capacity of the meeting location, a physical location of the meeting location, availability of the meeting location, and a meeting location type. Further, the location database 106 may be accessed whenever a meeting is to be scheduled by the system 100. Furthermore, the location database 106 may be periodically updated. For example, new data may be added into the location database 106, existing data in the location database 106 may be modified, or non-useful data may be deleted from the location database 106.

According to an example embodiment, the system 100 may include a receiver 108 and a meeting scheduler 110. In an example embodiment, the receiver 108 and the meeting scheduler 110 may be in communication with each other to perform the functionalities of the system 100.

In an example embodiment, the receiver 108 of the system 100 may receive an input from the user. The input may be indicative of a request to schedule a meeting. In response to receiving the input, the receiver 108 may prompt the user to provide meeting information. The meeting information may include time information and attendee information for scheduling the meeting. In an example, the attendee information comprises names of attendees for the meeting.

In addition, once the meeting information is received, the meeting scheduler 110 of the system 100 may identify one or more potential dates for scheduling the meeting based on the meeting information. A potential date has one or more potential times for scheduling the meeting. Subsequently, the meeting scheduler 110 may determine availability of the attendees based on the potential dates for scheduling the meeting. In an example, the meeting scheduler 110 may determine the availability of the attendees using the server 102 and the location database 106.

Furthermore, subsequent to determination of the availability of the attendees, the meeting scheduler 110 may detect locations of the attendees. The locations of the attendees may be determined based on the availability of the attendees and the potential dates. In an example, locations of only those attendees are determined who are available on the potential dates for the meeting. Thereafter, the meeting scheduler 110 may identify one or more meeting locations based on the locations of the attendees. In an example, a meeting location may be a place in the enterprise where the meeting may be held. The meeting scheduler 110 may further determine availability of the meeting locations based on the potential dates for scheduling the meeting. In an example embodiment, the meeting scheduler 110 may determine the meeting locations and the availability of the meeting locations based on information stored in the location database 106.

In an example embodiment, the meeting scheduler 110 may compute date scores for the potential dates based on the meeting information. The meeting scheduler 110 may further compute time scores for the potential times based on the meeting information and the availability of the attendees, and location scores for the available meeting locations based on proximity to the locations of the attendees. Furthermore, the meeting scheduler 110 may select a date, a time, and a meeting location from amongst the potential dates, times, and meeting locations to determine a meeting schedule. The meeting scheduler 110 may select the date, the time, and the meeting location based on the date scores, the time scores, and the location scores.

Additionally, the meeting scheduler 110 may select a conferencing mechanism from at least one of an audio conferencing mechanism, a video conferencing mechanism, an in-person conference mechanism, or any combination thereof, based on the selected meeting location for the meeting schedule. In addition, the meeting scheduler 110 may determine the conferencing mechanism for the meeting based on the workplace locations of the attendees. The meeting scheduler 110 may then provide the meeting schedule comprising the selected date, time, and meeting location, and the selected conferencing mechanism as a meeting invite option to the user. The manner in which system 100 determines meeting schedules is further described in detail in conjunction with FIG. 2.

Figure 2:
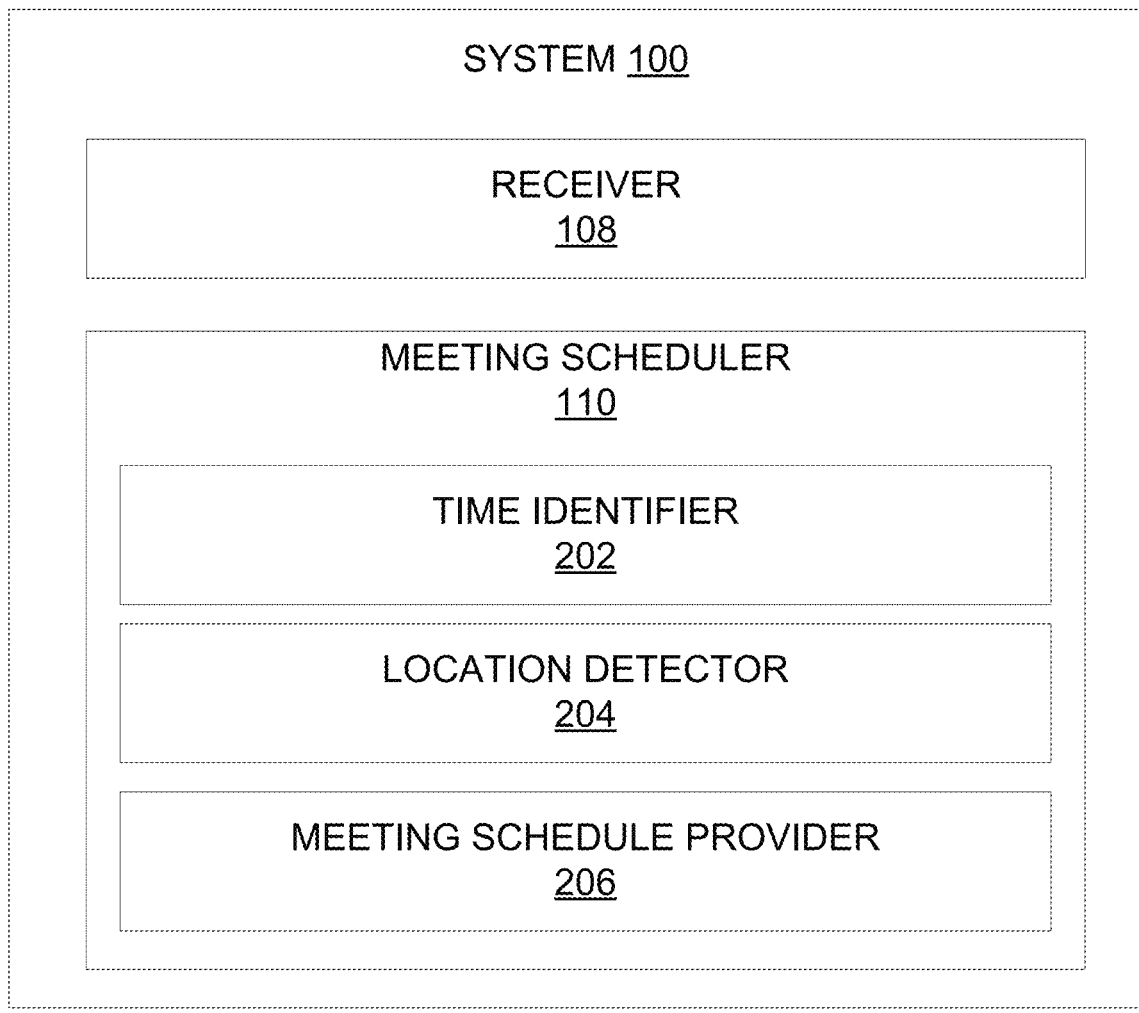
FIG. 2 illustrates a block diagram of the system, according to an example embodiment of the present disclosure.

FIG. 2 illustrates a block diagram of the system 100, according to an example embodiment of the present disclosure. As described above, the system 100 may include the receiver 108 and the meeting scheduler 110. Further, in an example embodiment, the meeting scheduler 110 may include a time identifier 202, a location detector 204, and a meeting schedule provider 206. In an example embodiment, the time identifier 202 may be in communication with the receiver 108. The location detector 204 may be in communication with the time identifier 202, and the meeting schedule provider 206 may be in communication the location detector 204.

In an example embodiment, the receiver 108 of the system 100 may receive an input from a user. The input may be indicative of a request to schedule a meeting. The user may be an employee of an enterprise who needs to schedule the meeting between two or more employees of the enterprise.

In an example, the receiver 108 may be a user interface, such that the input received from the user may be a touch input or a button input.

Further, in response to receiving the input, the receiver 108 may prompt the user to provide meeting information. In an example, the meeting information may include time information and attendee information for scheduling the meeting. The time information may be indicative of one of a preferred date range for the meeting, an approximate time period from a current period, and a specific date and time for the meeting. Further, the attendee information may comprise names of attendees that are required for the meeting.

In an example, the receiver 108 may display a list of attendees for user selection. The list of attendees may include contact details of those attendees with whom the user has met within a certain time period. Further, the list of attendees may also include a "favorites" section that indicates those attendees with whom the user has met most frequently. In another example, the receiver 108 may display a searchable contact list to the user for textual search. Contact details of an attendee may include information, such as name of the attendee, contact number of the attendee, workplace details of the attendee, and the like. In an example embodiment, the receiver 108 may contact a server (not shown) to obtain the list of attendees.

Furthermore, the receiver 108 may display a list of time constraints for user selection. In an example, the list of time constraints includes selectable options, such as "ASAP", "Next Week", "Specific date and time", and the like. In case the user selects the "Specific date and time" option, then the receiver 108 may further provide "Date Picker" and "Time Picker" controls to the user for setting up a specific date and time for the meeting. The list of time constraints may further include selectable options for duration of the meeting. In an example, the selectable options for the duration of the meeting may be "30 minutes", "45 minutes", "60 minutes", etc.

In an example embodiment, based on the time information, the time identifier 202 of the meeting scheduler 110 may identify one or more potential dates for scheduling the meeting. The potential dates may be those dates that meet the time constraints provided by the user. A potential date has one or more potential times for scheduling the meeting. In an example, a potential date may be understood as a date on which the system 100 attempts to schedule the meeting and a potential time may be understood as a time at which the system 100 attempts to schedule the meeting.

Furthermore, the location detector 204 of the meeting scheduler 110 may determine availability of each attendee based on types of availability and the potential dates for scheduling the meeting. In an example, the types of availability may include tentative or free, busy, and if an attendee is required or optional. In an example embodiment, the location detector 204 may communicate with the server to retrieve calendar items of each attendee to determine availability of the attendees against the potential dates. In an example, calendar items of an attendee may be indicative of meetings that are already scheduled for the attendee and details of meeting locations associated with the scheduled meetings. In an example embodiment, the location detector 204 may determine availability of attendees as to whether the attendees are free or busy based on a program code provided below:

```
List<AvailabilityType> busyAvailabilities = new
List<AvailabilityType> {
    AvailabilityType.Busy,
    AvailabilityType.Tentative,
    AvailabilityType.Oof
};
List<AvailabilityType> freeAvailabilities = new
List<AvailabilityType>
{
    AvailabilityType.Free,
    AvailabilityType.NoData
};
Score score = new Score(1.0, "Availability score");
if (busyAvailabilities.Contains(availability.OrganizerAvailability)) {
    score.Scale(OrganizerBusyPenalty, "The organizer is busy.");
}
//      1.0 |\
//          | |
//          | \
//          |  \_
//          |   \____
//      0.2 |_ _ _\____
//          |
//_____
// Busy Required Attendees
    int busyRequiredAttendees = busyAvailabilities.Sum(type =>
availability.RequiredAttendeeAvailability[type]);
    if (availability.TotalRequiredAttendees > 0 &&
busyRequiredAttendees > 0) {
        score.Adjust(
            target: RequiredBusyPenalty * score,
            adjustmentRatio: 1 - (1.0 / (busyRequiredAttendees + 2)),
            reason: String:Format("{0} of {1} required attendees are busy.",
busyRequiredAttendees, availability.TotalRequiredAttendees)
        );
    }
    int busyOptionalAttendees = busyAvailabilities.Sum(type =>
availability.OptionalAttendeeAvailability[type]);
    if (availability.TotalOptionalAttendees > 0 &&
busyOptionalAttendees > 0) {
        score.Adjust(
            target: OptionalBusyPenalty * score,
            adjustmentRatio: 1 - (1.0 / (busyOptionalAttendees + 2)),
            reason: String.Format("{0} of {1} optional attendees are busy.",
busyOptionalAttendees, availability.TotalOptionalAttendees)
        );
    }
}
return score;
```

In addition, the location detector 204 may detect location of each attendee based on the availability, the potential dates, and a location group tree. For example, the location detector 204 may detect a location of an attendee based on the availability of the attendee with respect to the potential dates and times.

In an example embodiment, the location detector 204 may detect a location of an attendee based on a workplace location of the attendee, meeting locations associated with meetings that are already scheduled for the attendee and geo-location of the attendee. In an example, a current geo-location of the attendee may be determined in a real-time using a Global Positioning System (GPS) enabled mobile device associated with the attendee. The location detector 204 may obtain GPS location data pertaining to the attendee from the GPS enabled mobile device associated with the attendee. In an example, the GPS location data of the attendee may be indicative of one of a specific location of the attendee and a proximity to a location of the attendee. In a scenario, if the workplace location of the attendee is "A", however, the GPS location data pertaining to the attendee indicates the location of the attendee to be "B", and the meeting needs to be scheduled ASAP, then the location detector 204 may detect the location of the attendee to be "B". Likewise, the location detector 204 may detect the location of each attendee for each potential date and time. In an example, a location of an attendee may include information pertaining to the city of the attendee and information about the building and associated floor at which the attendee is present.

In an example embodiment, to detect a location of an attendee on a given day, the location detector 204 may communicate with the server to fetch information of meeting schedules of the attendee for that day and meeting locations associated with the meeting schedules. Furthermore, the location detector 204 may communicate with the location database (not shown) to determine information of the meeting locations associated with the meeting schedules of the attendee. In an example, the location detector 204 may compare the workplace location of the attendee with the meeting locations of the attendee to determine a location of the attendee.

Furthermore, the location detector 204 may detect the locations of the attendees based on the location group tree. The location group tree is a recursive data structure, which sorts attendees into location groups. In an example, to detect a location of an attendee based on scheduled meetings of the attendee, the location detector 204 may put the attendee's meeting locations in the location group tree, and the location detector 204 may detect the attendee's location based on a location group containing most meetings.

In an example embodiment, the location detector 204 may identify one or more potential meeting locations based on the locations of the attendees. In an example, the location detector 204 may correlate the locations of the attendees with the location database to identify meeting locations for scheduling the meeting. In an example, based on the locations of the attendees, the location detector 204 may identify the meeting locations based on city or building in which the attendees are located. The location detector 204 may prefer meeting rooms on a particular floor of the building that contains the most attendees. Further, in an example, the location detector 204 may identify the potential meeting rooms based on the location group tree. To identify a meeting location for a meeting, locations of the attendees are put into the location group tree, and the most specific location group containing the most attendees is selected. The location detector 204 may further determine availability of the meeting locations based on the potential dates for scheduling the meeting. In an example, the location detector 204 may determine the availability of the meeting locations using the location database.

In an example embodiment, the meeting schedule provider 206 of the meeting scheduler 110 may compute a date score for each potential date based on the meeting information. In an example, a date score for a potential date is computed based on how closely the potential date matches the time constraints provided by the users. The meeting schedule provider 206 may further compute a time score for each potential time based on the meeting information and the availability of the attendees. In an example, a time score for a potential time may be computed based on the time information and availability of the attendee at the potential time. Furthermore, the meeting schedule provider 206 may compute time scores based on time-zone information associated with the attendees. In an example, the time scores may be computed as 0 or 1.

The meeting schedule provider 206 may further compute a location score for each of the available meeting locations. In an example embodiment, the meeting schedule provider 206 may compute a location score for a meeting location based on proximity to the locations of the attendees, capacity of the meeting location relative to a number of meeting attendees, and recent meeting locations of the user. In an example embodiment, the meeting schedule provider 206 may compute a location score for a meeting location based on a program code provided below.

```
Location Score Enumerator
if (room.Capacity == null) {
// If we don't know the location's capacity, we can't judge how to
update its score.
location.Score.Scale(1.0, "Unknown capacity.");
return;
}
int extraCapacity = (int)room.Capacity – desiredCapacity;
if (extraCapacity > 0 && extraCapacity <= 2) {
location.Score.Scale(1.0, "Room is comfortably large. (1-2 extra
capacity)");
}
else if (extraCapacity > 2 && extraCapacity <= 6) {
location.Score.Scale(0.8, "The room is a bit too large. (3-6 extra
capacity)");
}
else if (extraCapacity > 6) {
location.Score.Scale(0.5, "The room is way too large. (>6 extra
capacity)");
}
else if (extraCapacity < 0 && extraCapacity >= –2) {
location.Score.Scale(0.4, "The room is a bit too small. (1-2 under
capacity)");
}
else if (extraCapacity < –2) {
location.Score.Scale(0.0, "The room is too small. (>2 under
capacity)");
}
```

Furthermore, the meeting schedule provider 206 may resolve a conflict with a pre-existing meeting based on at least one of a seniority of an attendee attending the pre-existing meeting, a type of the pre-existing meeting, an identity of an organizer of the pre-existing meeting, and a number of attendees attending the pre-existing meeting. In addition, based on the date scores, the time scores, the location scores, and the conflict resolution, the meeting schedule provider 206 may select a date, a time, and a meeting location from amongst the potential dates, times, and meeting locations to determine a meeting schedule. In an example implementation, the selected date is a date with a highest date score, the selected time is a time with a highest time score, and the selected meeting location is a meeting location with a highest location score.

In addition, the meeting schedule provider 206 may select a conferencing mechanism from at least one of an audio conferencing mechanism, a video conferencing mechanism, an in-person conference mechanism, or any combination thereof, based on the selected meeting location for the meeting schedule. In an example, if the selected meeting location is in a different location in comparison to locations of one or more attendees, then the meeting may be scheduled using a video conferencing mechanism. Subsequently, the meeting schedule provider 206 may provide the meeting schedule comprising the selected date, time, and meeting location, and the selected conferencing mechanism as a meeting invite option to the user.

In the present disclosure, because a suitable date, time, and, meeting location for a meeting are automatically identified by system 100 based on time score, date scores, and location scores, there is no need for a user to manually determine the date, time, and meeting location from amongst potential dates, times, and meeting locations for scheduling the meeting. Thus, automatic determination of the date, time, and the location may reduce time and effort required by the user. In addition, the process of determination of date, time, and meeting location may be performed by the system in an efficient, reliable, accurate, and robust manner.

Figure 3:
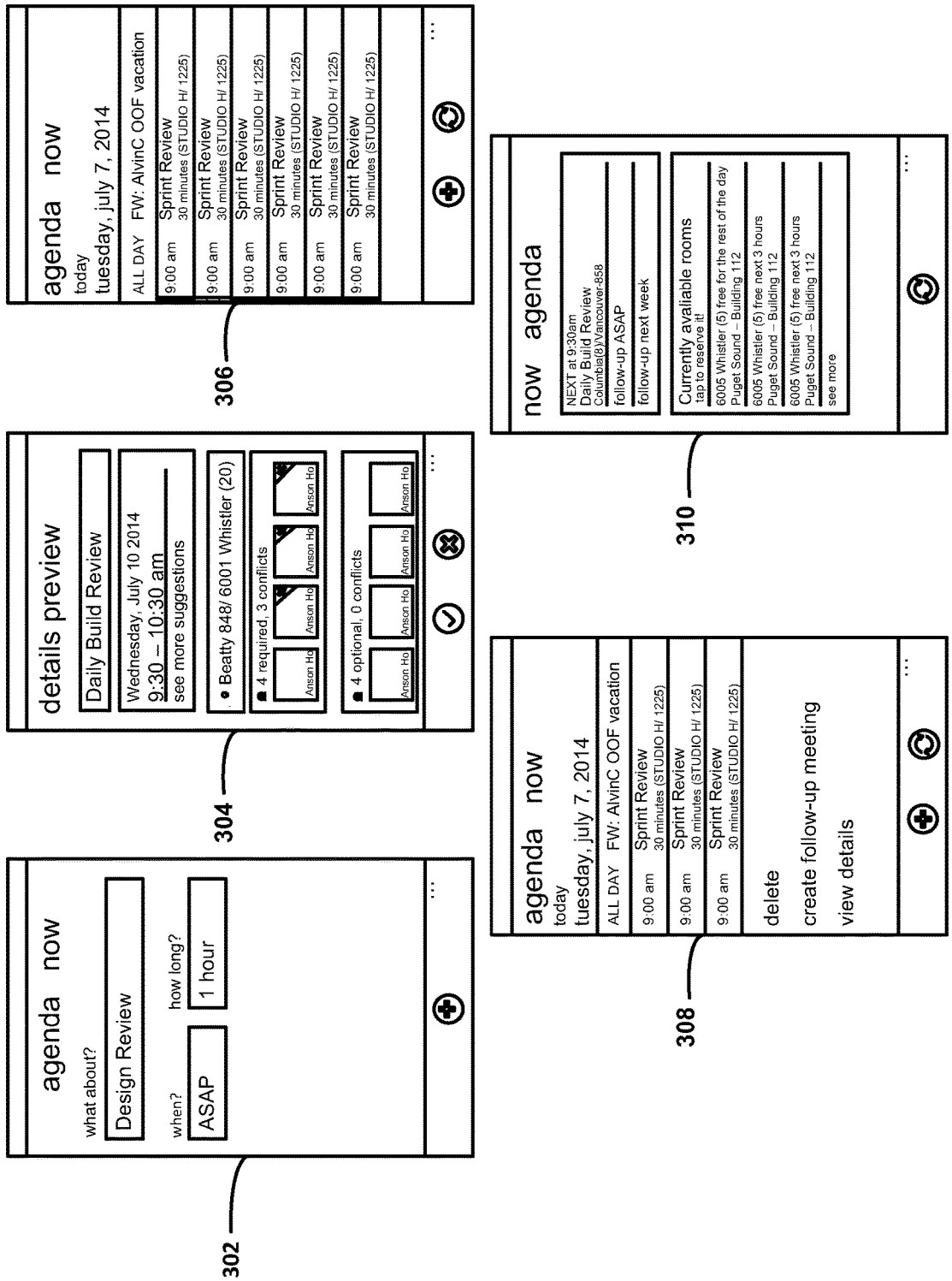
FIG. 3 illustrates potential wireframes of an application for determination of a meeting schedule, according to an example embodiment of the present disclosure.

FIG. 3 illustrates potential wireframes of an application for determination of a meeting schedule, according to an example embodiment of the present disclosure. In an example embodiment, the application may be a mobile application that automatically determines a meeting schedule.

In an example embodiment, when a user who needs to schedule a meeting, opens the mobile application on a mobile device, the user directly lands on a homepage of the mobile application with different options and features. In an example, the options may be pre-populated to reduce the amount of user interaction needed. The homepage may allow the user to customize the meeting details, for example, meeting subject and duration. As can be seen in FIG. 3, a wireframe 302 illustrates a potential wireframe for the homepage. In an example, the user may not know in specific when the user wants to schedule the meeting. The mobile application may provide various options for different time constraints such as, "as soon as possible" and "next week". Also, the mobile application may provide specific types of meetings as options for user selection. In an example, a lunch meeting may be one of the meeting types. Accordingly, the mobile application may consider a time slot around noon for scheduling a lunch meeting. By doing so, the mobile application relieves the user from the task for figuring out the best time for all attendees to meet. The mobile application also relieves the user from the task of finding a meeting location that is available and can include all meeting attendees.

Following the homepage, the user may select meeting attendees before being brought to the confirmation page. In an example, the mobile application may automatically filter the attendees based on a number of times of interactions between the attendees and mobile application. In an example embodiment, the mobile application may calculate a best time and meeting location pair based on the meeting attendees. The meeting details are then displayed on the confirmation page. Because the best time and meeting location pair is automatically determined by the mobile application, the user does not have to determine a time or meeting location for the meeting. The meeting room suggested by the mobile application will always be available and will accommodate all meeting attendees.

Furthermore, on the confirmation page, an overview of the meeting is provided by the mobile application. The user may preview how the meeting fits into the user's day. In addition, the user may also be notified if there are any attendee conflicts. In an example, the mobile application may resolve any meeting conflicts based on factors, such as who is most important in the meeting, and who can reschedule their meetings easily. For example, the mobile application may consider availability and designation of the attendee while scheduling the meeting. The mobile application may prioritize the attendee with a higher designation. In an example, because a General Manager (GM) of an enterprise is associated with a higher designation in comparison to a Project Manager (PM), the mobile application may first look into the calendar of the GM of the enterprise for scheduling the meeting, and assign a lower weight to the PM. Also, an administrator may schedule the meeting on behalf of the GM. In addition, the mobile application may take into consideration whether the user who needs to schedule the meeting is an organizer or an attendee. If the user is an organizer then there is a lower chance of a conflict because if the user is an organizer then it is easier to reschedule the meeting. On the other hand, if the user is an attendee then it may be difficult to reschedule the meeting.

Furthermore, the mobile application may take into consideration a type of meeting conflict while scheduling the meeting. In an example, a recurring meeting may be a type of meeting conflict and the mobile application may be assign a lower weight for this conflict meeting. In addition, the mobile application may determine conflicts with time zones and lunch hours based on, for example, a program code provided below.

```
Protected Score
GetAttendeeWorkingHoursAgnosticTimeScore(Attendee
attendee, TimeInterval time, ITimeZoneEx timeZone) {
double LunchtimeScore = 0.7;
double EarlyMorningScore = 0.4;
double LateAfternoonScore = 0.4;
double MidnightScore = 0.0;
TimeSpan start = timeZone.ConvertTime(time.Start).TimeOfDay;
TimeSpan end = timeZone.ConvertTime(time.End).TimeOfDay;
string timeZonePreamble = String.Format("Time score for {0} in
{1}. ", attendee.Name, timeZone.Id);
if (end < start) {
return new Score(MidnightScore, String. Format(
timeZonePreamble + "The meeting time is in the middle of the
night ({0} - {1}).",
start, end
));
}
else if (end > TimeSpan.FromHours(18)) {
return new Score(MidnightScore, timeZonePreamble + "The
meeting occurs late in the evening.").Adjust(
target: LateAfternoonScore,
adjustmentRatio: (24 - end.TotalHours) / 6.0,
reason: String.Format("The meeting ends at {0}.", end)
);
}
else if (start < TimeSpan.FromHours(8)) {
return new Score(MidnightScore, timeZonePreamble + "The
meeting occurs very early in the morning.").Adjust(
target: EarlyMorningScore,
adjustmentRatio: start.TotalHours / 8.0,
reason: String.Format("The meeting starts at {0}.", start)
);
}
else if (end > TimeSpan.FromHours(16)) {
return new Score(LateAfternoonScore, timeZonePreamble + "The
meeting occurs late in the afternoon.").Adjust(
target: 1.0,
adjustmentRatio: (18 - end.TotalHours) / 2.0,
reason: String.Format("The meeting ends at {0}.", end)
);
}
else if (start < TimeSpan.FromHours(10)) {
return new Score(EarlyMorningScore, timeZonePreamble + "The
meeting occurs early in the morning.").Adjust(
target: 1.0,
adjustmentRatio: (start.TotalHours - 8.0) / 2.0,
reason: String.Format("The meeting starts at {0}.", start)
);
}
else if ((start < TimeSpan.FromHours(12) && end >
TimeSpan.FromHours(12)) ||
(start >= TimeSpan.FromHours(12) && start <
TimeSpan.FromHours(13)))
{
return new Score(LunchtimeScore, String.Format(
timeZonePreamble + "The meeting occurs during lunchtime ({0} -
{1}).",
start, end
));
}
else {
return new Score(1.0, String.Format(
timeZonePreamble + "The meeting occurs during peak working
hours ({0} - {1}).",
start, end
));
}
}
}
```

Also, the user can make any modifications if necessary directly from the confirmation or view other meeting suggestions times. As can be seen in FIG. 3, a wireframe 304 illustrates a potential wireframe for the confirmation page. Further, based on needs analysis, users often create follow-up meetings or even reschedule the existing meetings. In an example, the user may be able to view the meeting agenda on the homepage of the mobile application. A wireframe 306 illustrates a potential wireframe for agenda page.

In an example embodiment, the user can directly tap on the meeting to create a follow-up meeting or schedule it. A wireframe 308 illustrates a potential wireframe for follow-up meeting. Also, the mobile application infers all attendees, meeting location, and time from the existing meeting in order to propose a new time and meeting location to the user. Furthermore, when the user needs a meeting location "right now", the process of creating a meeting can be completely avoided. For meetings "right now", the user may already be ready with all the meeting attendees and are just in the process of searching for a meeting location. Instead of trying to find an available meeting location or creating a new meeting entirely, the user may directly view which meeting locations are available around the meeting attendees. The user, in a best-case scenario, may only need to navigate on the "now" page. A wireframe 310 illustrates a potential "now" page wireframe.

Figure 4:
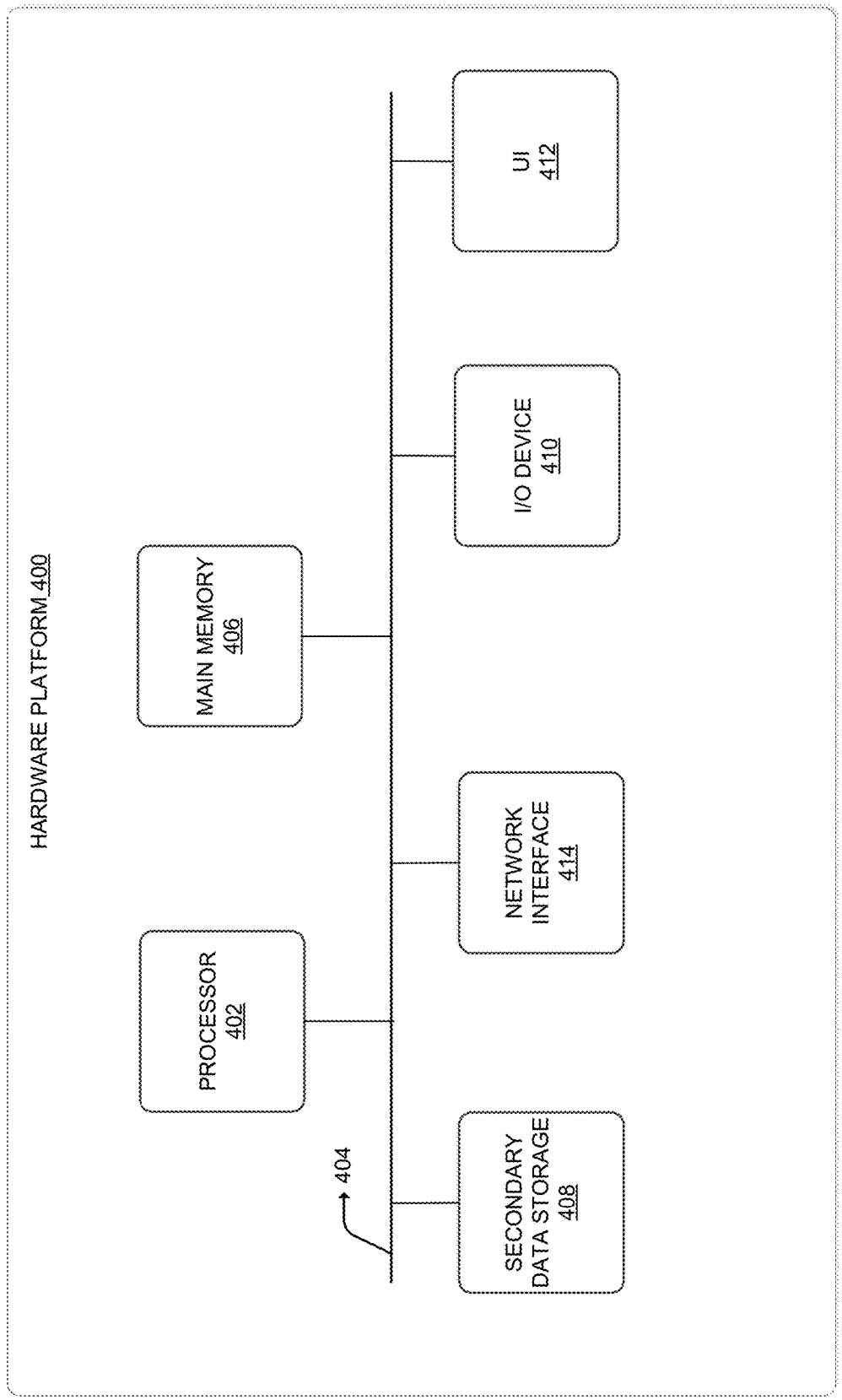
FIG. 4 illustrates a hardware platform for implementation of the system, according to an example embodiment of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g.; RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine-readable instructions performing some or all of the methods, functions, techniques and/or other processes described herein. Commands and data from the processor 402 may be communicated over a communication bus 404. The computer system 400 may also include a main memory 406, such as a random access memory (RAM), where the machine readable instructions and data for the processor 402 may reside during runtime, and a secondary data storage 408, which may be non-volatile and stores machine readable instructions and data. The memory 406 and data storage 408 are examples of non-transitory computer readable mediums. The memory 406 and/or the secondary data storage may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5B:
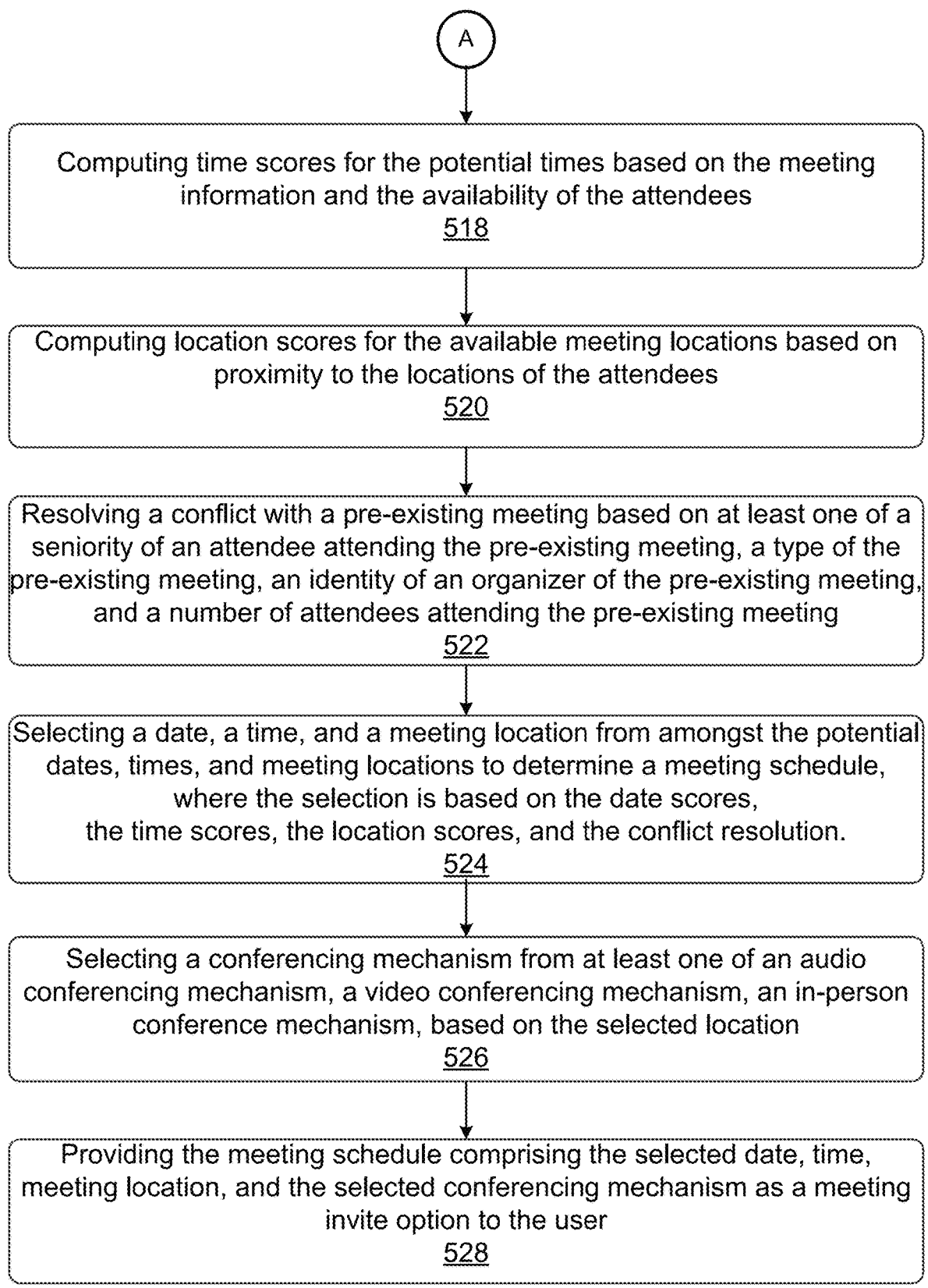

FIG. 5a and FIG. 5b, hereinafter FIG. 5, illustrate a computer-implemented method 500 depicting functionality of the system 100, according to an example embodiment of the present disclosure. For the sake of brevity, construction and operational features of the system 100 which are explained in detail in the description of FIG. 1, FIG. 2, FIG. 3, and FIG. 4 are not explained in detail in the description of FIG. 5.

At method block 502, the method 500 commences with receiving an input from a user, wherein the input is indicative of a request to schedule a meeting.

At method block 504, in response to receiving the input, the user is prompted to provide meeting information including time information and attendee information for scheduling the meeting. In an example, the time information is indicative of one of a preferred date range for the meeting, an approximate time period from a current period, and a specific date and time for the meeting.

At method block 506, one or more potential dates are identified for scheduling the meeting based on the meeting information, wherein a potential date has one or more potential times for scheduling the meeting.

At method block 508, availability of the attendees is determined based on the potential dates for scheduling the meeting.

At method block 510, locations of the attendees are detected based on the availability of the attendees, the potential dates, and a location group tree, wherein the location group tree is a recursive data structure. In an example, the location group tree comprises meeting locations of scheduled meetings of the attendees. Furthermore, the locations of the attendees may further be detected based on geographical locations of the attendees and workplace locations of the attendees.

At method block 512, one or more potential meeting locations are identified based on the locations of the attendees. In an example, the one or more meeting locations may be identified based on information stored in a location database.

At method block 514, availability of the meeting locations is determined based on the potential dates for scheduling the meeting.

At method block 516, date scores for the potential dates are computed based on the meeting information:

At method block 518, time scores for the potential times are computed based on the meeting information and the availability of the attendees. In an example, the time scores may further be computed based on time zone information associated with the attendees.

At method block 520, location scores for the available meeting locations are computed based on proximity to the locations of the attendees. In an example, the location scores for the meeting locations may further be computed based on location information comprising seating capacity of the meeting locations and recent meeting locations of the user.

At method block 522, a conflict with a pre-existing meeting is resolved based on at least one of a seniority of an attendee attending the pre-existing meeting, a type of the pre-existing meeting, an identity of an organizer of the pre-existing meeting, and a number of attendees attending the pre-existing meeting.

At method block 524, a date, a time, and a meeting location are selected from amongst the potential dates, times, and meeting locations to determine a meeting schedule, wherein the selection is based on the date scores, the time scores, the location scores, and the conflict resolution.

At method block 526, a conferencing mechanism is selected from at least one of an audio conferencing mechanism, a video conferencing mechanism, an in-person conference mechanism, or any combination thereof, based on the selected location for the meeting schedule.

At method block. 528, the meeting schedule comprising the selected date, time, and meeting location, and the selected conferencing mechanism is provided as a meeting invite option to the user. In an example, the selected date is a date with a highest date score, the selected time is a time with a highest time score, and the selected meeting location is a meeting location with a highest location score.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a processor; and
a memory storing instructions that when executed cause the processor to:
receive, via a graphical user interface of a user device, a request to schedule a meeting;
in response to receiving the request, prompt on the graphical user interface of the user device for user input of meeting information including time information and information of attendees for scheduling the meeting;
in response to receiving the user input of the meeting information, identify potential dates and potential times for scheduling the meeting based on the meeting information;
determine availability of the attendees on the potential dates based on calendar information of the attendees obtained from a server;
detect locations of the attendees based on the availability of the attendees on the potential dates, Global Positioning System (GPS) sensors on devices of the attendees, and a location group tree, wherein the location group tree is a recursive data structure that sorts the attendees into location groups;
identify potential meeting locations based on the locations of the attendees;
determine availability of the potential meeting locations based on the potential dates for scheduling the meeting;

compute date scores for the potential dates based on the meeting information;
compute time scores for the potential times based on the meeting information and the availability of the attendees;
compute location scores for the potential meeting locations based on proximity of the potential meeting locations to the locations of the attendees;
resolve a conflict with a pre-existing meeting based on one of a seniority of an attendee attending the pre-existing meeting, a type of the pre-existing meeting, an identity of an organizer of the pre-existing meeting, and a number of attendees attending the pre-existing meeting;
select a date, a time, and a meeting location from amongst the potential dates, the potential times, and the potential meeting locations to determine a meeting schedule, wherein the selection is based on the date scores, the time scores, the location scores, and the conflict resolution;
select a conferencing mechanism from one of an audio conferencing mechanism, a video conferencing mechanism, or an in-person conference mechanism based on the selected meeting location for the meeting schedule;
mark a calendar with the meeting schedule including the selected date, the selected time, the selected meeting location, and the selected conference mechanism;
display, on the graphical user interface of the user device, the calendar marked with the meeting schedule; and
transmit, via a network, the meeting schedule comprising the selected date, the selected time, the selected meeting location, and the selected conferencing mechanism as a meeting invite to the attendees.

2. The system of claim 1, wherein the system is implemented as a mobile application in a mobile device.

3. The system of claim 1, wherein the time information is indicative of one of a preferred date range for the meeting, an approximate time period from a current period, and a specific date and time for the meeting.

4. The system of claim 1, wherein the selected date is a date with a highest date score and the selected time is a time with a highest time score.

5. The system of claim 1, wherein the selected meeting location is a meeting location with a highest location score.

6. The system of claim 1, wherein the location group tree comprises meeting locations of scheduled meetings of the attendees.

7. The system of claim 1, wherein the instructions are further executable to cause the processor to compute the time scores for the potential times based on time-zone information associated with the attendees.

8. The system of claim 1, wherein the potential meeting locations are identified based on a location database.

9. The system of claim 1, wherein the instructions are executable to cause the processor to compute the location scores for the potential meeting locations further based on location information comprising seating capacity of the potential meeting locations and recent meeting locations of the attendees.

10. A non-transitory computer readable storage medium storing instructions that when executed cause a processor to:
receive, via a graphical user interface of a user device, a request to schedule a meeting;
in response to receiving the request, prompt on the graphical user interface of the user device for user input of meeting information including time information and information of attendees for scheduling the meeting;
in response to receiving the user input of the meeting information, identify potential dates and potential times for scheduling the meeting based on the meeting information;
determine availability of the attendees on the potential dates based on calendar information of the attendees obtained from a server;
detect locations of the attendees based on the availability of the attendees on the potential dates, Global Positioning System (GPS) sensors on devices of the attendees, and a location group tree, wherein the location group tree is a recursive data structure that sorts the attendees into location groups;
identify potential meeting locations based on the locations of the attendees;
compute date scores for the potential dates based on the meeting information;
compute time scores for the potential times based on the meeting information and the availability of the attendees;
compute location scores for potential meeting locations based on proximity of the potential meeting locations to the locations of the attendees;
select a date, a time, and a meeting location from amongst the potential dates, the potential times, and the potential meeting locations to determine a meeting schedule, wherein the selection is based on the date scores, the time scores, and the location scores;
select a conferencing mechanism from one of an audio conferencing mechanism, a video conferencing mechanism, or an in-person conference mechanism based on the selected meeting location for the meeting schedule;
mark a calendar with the meeting schedule including the selected date, the selected time, the selected meeting location, and the selected conference mechanism;
display, on the graphical user interface of the user device, the calendar marked with the meeting schedule; and
transmit, via a network, the meeting schedule comprising the selected date, the selected time, the selected meeting location, and the selected conferencing mechanism as a meeting invite to the attendees.

11. The non-transitory computer readable storage medium of claim 10, wherein the location group tree comprises meeting locations of scheduled meetings of the attendees.

12. The non-transitory computer readable storage medium of claim 10, wherein the instructions are executable to cause the processor to: determine availability of the potential meeting locations based on the potential dates for scheduling the meeting.

13. The non-transitory computer readable storage medium of claim 10, wherein the selected date is a date with a highest date score and the selected time is a time with a highest time score.

14. The non-transitory computer readable storage medium of claim 10, wherein the selected meeting location is a meeting location with a highest location score.

15. The non-transitory computer readable storage medium of claim 10, wherein the instructions are executable to cause the processor to compute the location scores for the potential meeting locations further based on location information comprises seating capacity of the potential meeting locations and recent meeting locations of the attendees.

16. The non-transitory computer readable storage medium of claim 10, wherein the locations of the attendees are determined based on geographical locations of the attendees and workplace locations of the attendees.

17. A computer-implemented method, executed by a processor, the method comprising:
- receiving a request on a graphical user interface of a user device to schedule a meeting;
- in response to receiving the request, prompting on the graphical user interface of the user device for user input of meeting information including time information and information of attendees for scheduling the meeting;
- in response to receiving the user input of the meeting information, identifying, by the processor, potential dates and potential times for scheduling the meeting based on the meeting information;
- determining, by the processor, availability of the attendees on the potential dates based on calendar information of the attendees obtained from a server;
- detecting, by the processor, locations of the attendees based on the availability of the attendees on the potential dates, Global Positioning System (GPS) sensors on devices of the attendees, and a location group tree, wherein the location group tree is a recursive data structure that sorts the attendees into location groups;
- identifying, by the processor, potential meeting locations based on the locations of the attendees;
- determining, by the processor, availability of the potential meeting locations based on the potential dates for scheduling the meeting;
- computing, by the processor, date scores for the potential dates based on the meeting information;
- computing, by the processor, time scores for the potential times based on the meeting information and the availability of the attendees;
- computing, by the processor, location scores for the potential meeting locations based on proximity to the locations of the attendees;
- resolving, by the processor, a conflict with a pre-existing meeting based on one of a seniority of an attendee attending the pre-existing meeting, a type of the pre-existing meeting, an identity of an organizer of the pre-existing meeting, and a number of attendees attending the pre-existing meeting;
- selecting, by the processor, a date, a time, and a meeting location from amongst the potential dates, the potential times, and the potential meeting locations to determine a meeting schedule, wherein the selection is based on the date scores, the time scores, the location scores and the conflict resolution;
- selecting, by the processor, a conferencing mechanism from one of an audio conferencing mechanism, a video conferencing mechanism, or an in-person conference mechanism based on the selected meeting location for the meeting schedule;
- marking, by the processor, a calendar with the meeting schedule including the selected date, the selected time, the selected meeting location, and the selected conference mechanism;
- displaying, on the graphical user interface of the user device, the calendar marked with the meeting schedule; and
- transmitting, via a network, the meeting schedule comprising the selected date, the selected time, the selected meeting location, and the selected conferencing mechanism as a meeting invite to the attendees.

18. The computer-implemented method of claim 17, wherein the time information is indicative of one of a preferred date range for the meeting, an approximate time period from a current period, and a specific date and time for the meeting.

19. The computer-implemented method of claim 17, wherein the time scores are further computed based on time-zone information associated the attendees.

20. The computer-implemented method of claim 17, wherein the location group tree comprises meeting locations of scheduled meetings of the attendees.

* * * * *